(12) United States Patent
Zula (10) Patent No.: US 10,055,900 B2
(45) Date of Patent: *Aug. 21, 2018

(54) APPARATUS AND SYSTEM FOR COMMUNICATING A FAULT IN A COMBINATION VEHICLE

(71) Applicant: Bendix Commercial Vehicle Systems LLC, Elyria, OH (US)

(72) Inventor: Daniel P. Zula, North Ridgeville, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/789,163

(22) Filed: Oct. 20, 2017

(65) Prior Publication Data

US 2018/0040170 A1    Feb. 8, 2018

Related U.S. Application Data

(63) Continuation of application No. 14/576,322, filed on Dec. 19, 2014, now Pat. No. 9,824,506.

(51) Int. Cl.
*B60R 16/023* (2006.01)
*G07C 5/00* (2006.01)
*H04L 29/08* (2006.01)

(52) U.S. Cl.
CPC ............. *G07C 5/00* (2013.01); *B60R 16/023* (2013.01); *B60R 16/0232* (2013.01); *H04L 67/12* (2013.01)

(58) Field of Classification Search
CPC ................................ G07C 5/00; B60R 16/023
See application file for complete search history.

(56) References Cited

U.S. PATENT DOCUMENTS 6,127,939 A * 10/2000 Lesesky .............. B60R 16/0315
                                                      303/122
6,665,601 B1 * 12/2003 Nielsen ................... H04L 12/40
                                                         701/50

(Continued)

OTHER PUBLICATIONS

NPL-Power Line Carrier Communications for Commercial Vehicles, Jun. 2007, accessed on Jan. 31, 2018 https://www.sae.org/standards/content/j2497_201207/.*

*Primary Examiner* — Jess Whittington
(74) *Attorney, Agent, or Firm* — Cheryl L. Greenly; Brian E. Kondas; Eugene E. Clair (57) ABSTRACT

Various examples of a controller and system for transmitting and indicating a fault in a combination vehicle are disclosed. A first towed vehicle controller comprises a communications port and a processor with control logic. The control logic determines the status of the first towed vehicle, receives fault messages on an associated vehicle communications bus, and transmits fault messages and status messages on the associated vehicle communications bus. When the control logic receives a fault message from an associated second towed vehicle controller on the associated vehicle communications bus, the control logic transmits the fault message of the associated second towed vehicle controller to the associated vehicle communications bus. The first towed vehicle controller may transmit the fault message at a first period in time, which is different than the second period in time in which the second towed vehicle controller transmitted the fault message.

16 Claims, 3 Drawing Sheets

(56) References Cited

U.S. PATENT DOCUMENTS

| | | | |
|---|---|---|---|
| 2002/0093245 A1* | 7/2002 | Claerhout | B60T 7/20 |
| | | | 303/123 |
| 2003/0043027 A1* | 3/2003 | Carson | H04B 3/54 |
| | | | 375/259 |
| 2005/0068223 A1* | 3/2005 | Vavik | H04B 7/155 |
| | | | 342/51 |
| 2010/0070149 A1* | 3/2010 | Fry | B60T 8/1708 |
| | | | 701/70 |
| 2013/0148748 A1* | 6/2013 | Suda | H04B 3/546 |
| | | | 375/257 |

* cited by examiner

APPARATUS AND SYSTEM FOR COMMUNICATING A FAULT IN A COMBINATION VEHICLE

CROSS REFERENCE TO RELATED APPLICATIONS

This application is a continuation of the pending U.S. patent application Ser. No. 14/576,322 entitled "Apparatus, System and Method for Communicating a Fault in a Combination Vehicle" filed Dec. 19, 2014, the entire disclosure of which is incorporated fully herein by reference.

BACKGROUND

The present invention relates to an apparatus, a system and a method for communicating a fault in a combination vehicle. Commercial vehicles, such as long haul tractors, may be equipped to pull more than one trailer. In some instances, a combination of three trailers and two dollies may be connected in series to the tractor to maximize the amount of cargo capable of being transported by the single tractor.

The tractor, trailers and dollies are required to be equipped with anti-lock braking systems (ABS). The power supply located on the tractor is generally connected in parallel with the trailers and dollies along long lengths of wire and multi-pin connectors at each portion of the combination vehicle. The tractor, trailer and dollies are capable of communicating among themselves using a power line carrier communication system over the shared power supply wire. If there is a fault in a trailer or dolly ABS, the fault must be communicated to the tractor to inform the driver of the vehicle of the trailer ABS fault. In some instances, the fault message from a trailer or trailers at the distal end of the combination vehicle will not be received by the tractor due to message degradation over the length of wire, loading on the power line, noise on the power line or other interference. There is a need for an improved method to communicate faults from a trailer or dolly to a tractor in a combination vehicle.

SUMMARY

Various embodiments of an apparatus for communicating a fault in a combination vehicle are disclosed. In accordance with one example, a first towed vehicle controller comprises an enclosure and a controller in the enclosure. The controller comprises a processor with control logic capable of determining at least one of a status and a fault of the first towed vehicle and transmitting fault messages and status messages on the associated vehicle communications bus and receiving fault messages and status messages on an associated vehicle communications bus. When the control logic receives a fault message from an associated second towed vehicle controller on the associated vehicle communications bus at a second period in time, the control logic transmits the fault message of the associated second towed vehicle controller to the associated vehicle communications bus at a first period in time, which is different than the second period in time.

In accordance with another example, a system for use in a combination vehicle for communicating faults is disclosed. In accordance with one example, the system comprises a tractor controller in communication with a vehicle communications bus; a first towed vehicle controller in communication with the vehicle communications bus and capable of receiving and transmitting messages to the vehicle communications bus; and a second towed vehicle controller in communication with the vehicle communications bus and capable of receiving and transmitting messages to the vehicle communications bus. The first towed vehicle controller discontinues transmitting a status message in response to receiving a fault message from the second towed vehicle controller at a second period in time and starts transmitting the fault message of the second towed vehicle controller to the vehicle communications bus at the first period in time, which is different than the second period in time.

In accordance with another aspect, a method for communicating a fault is disclosed. In accordance with one example, the method comprises receiving and transmitting messages on a vehicle communications bus among a first towed vehicle controller; a second towed vehicle controller and a tractor controller; transmitting a fault message from the second towed vehicle controller to the vehicle communications bus at a second period in time. The method further comprises receiving the fault message at the first towed vehicle controller on the vehicle communications bus and transmitting the fault message by the first towed vehicle controller at a first period in time, which is different than the second period in time.

BRIEF DESCRIPTION OF THE DRAWINGS

In the accompanying drawings which are incorporated in and constitute a part of the specification, examples of the invention are illustrated, which, together with a general description of the invention given above, and the detailed description given below, serve to exemplify the examples of this invention.

DETAILED DESCRIPTION

Figure 1:
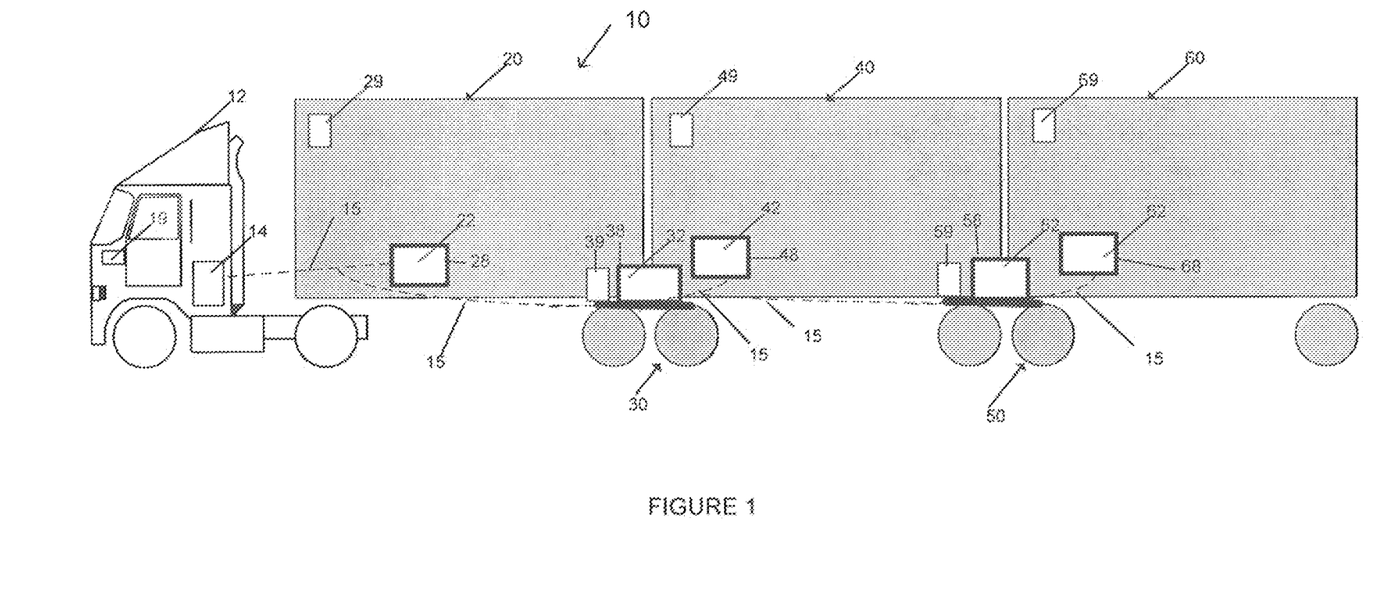
FIG. 1 illustrates a schematic representation of a combination vehicle equipped with a system according to an example of the present invention.

With reference to FIG. 1, a combination vehicle 10 is shown. The combination vehicle 10 comprises a tractor, or tractor 12. The tractor 12 includes a tractor controller 14, which may be an EC-60™ ABS Controller from Bendix Commercial Vehicle Systems LLC in Elyria, Ohio. The tractor controller 14 communicates with a towed vehicle anti-lock brake system (ABS) fault indicator 19, located in the cab of the tractor 12. The tractor controller 14 is also connected to a power line 15. The power line 15 is electrically connected in parallel with each of the towed vehicles in the combination vehicle 10 through wires of different lengths and multi-pin connectors on each towed vehicle (not shown).

The combination vehicle 10 further comprises a first trailer, or first towed vehicle 20, that is mechanically, electrically and pneumatically connected to the tractor 12. The first towed vehicle 20 includes a first towed vehicle controller 22, which may be a TABS-6 Trailer ABS module from Bendix Commercial Vehicle Systems LLC of Elyria Ohio. The first towed vehicle controller 22 is housed in an enclosure 28 and controls ABS functions on the first towed vehicle 20. The first towed vehicle controller 22 is in electrical communication with the power line 15. The first towed vehicle 20 also includes a first towed vehicle fault indicator 29. The first towed vehicle fault indicator 29 is located in a position on the first towed vehicle 20 separate from the first towed vehicle controller 22 that may be visible to the driver of the tractor 12.

The combination vehicle 10 further comprises a first dolly, or second towed vehicle 30, that is mechanically, electrically and pneumatically connected to the first towed vehicle 20. The second towed vehicle 30 includes a second towed vehicle controller 32, which may be a TABS-6 Trailer ABS module from Bendix Commercial Vehicle Systems LLC of Elyria Ohio. The second towed vehicle controller 32 is housed in an enclosure 38 and controls ABS functions on the second towed vehicle 30. The second towed vehicle controller 32 is in electrical communication with the power line 15. The second towed vehicle 30 also includes a second towed vehicle fault indicator 39. The second towed vehicle fault indicator 39 is located in a position on the second towed vehicle 30 separate from the second towed vehicle controller 32. The position of the second towed vehicle fault indicator 39 may be visible to the driver when he is in the tractor 12.

The combination vehicle 10 further comprises a second trailer, or third towed vehicle 40, that is mechanically, electrically and pneumatically connected to the second towed vehicle 30. The third towed vehicle 40 includes a third towed vehicle controller 42, which may be a TABS-6 Trailer ABS module from Bendix Commercial Vehicle Systems LLC of Elyria Ohio. The third towed vehicle controller 42 is housed in an enclosure 48 and controls ABS functions on the third towed vehicle 40. The third towed vehicle controller 42 is in electrical communication with the power line 15. The third towed vehicle 40 also includes a third towed vehicle fault indicator 49. The third towed vehicle fault indicator 49 is located in a position on the third towed vehicle 40 separate from the third towed vehicle controller 42 that may be visible to the driver of the tractor 12.

The combination vehicle 10 further comprises a second dolly, or fourth towed vehicle 50, that is mechanically, electrically and pneumatically connected to the third towed vehicle 40. The fourth towed vehicle 50 includes a fourth towed vehicle controller 52, which may be a TABS-6 Trailer ABS module from Bendix Commercial Vehicle Systems LLC of Elyria Ohio. The fourth towed vehicle controller 52 is housed in an enclosure 58 and controls ABS functions on the fourth towed vehicle 50. The fourth towed vehicle controller 52 is in electrical communication with the power line 15 from the tractor 12. The fourth towed vehicle 50 also includes a fourth towed vehicle fault indicator 59. The fourth towed vehicle fault indicator 59 is located in a position on the fourth towed vehicle 50 separate from the fourth towed vehicle controller 52 that may be visible to the driver of the tractor 12.

The combination vehicle 10 further comprises a third trailer, or fifth towed vehicle 60, that is mechanically, electrically and pneumatically connected to the fourth towed vehicle 50. The fifth towed vehicle 60 includes a fifth towed vehicle controller 62, which may be a TABS-6 Trailer ABS module from Bendix Commercial Vehicle Systems LLC of Elyria Ohio. The fifth towed vehicle controller 62 is housed in an enclosure 68 and controls ABS functions on the fifth towed vehicle 60. The fifth towed vehicle controller 62 is in electrical communication with the power line 15 from the tractor 12. The fifth towed vehicle 60 also includes a fifth towed vehicle fault indicator 69. The fifth towed vehicle fault indicator 69 is located in a position on the fifth towed vehicle 60 separate from the fifth towed vehicle controller 62 that may be visible to the driver of the tractor 12.

The towed vehicle ABS fault indicator 19 in the tractor 12 is required to be illuminated if there is an ABS fault in any one of the towed vehicles 20, 30, 40, 50, 60. The towed vehicle ABS fault indicator 19 will indicate any towed vehicle ABS fault to the driver as long as the tractor controller 14 receives a towed vehicle ABS fault communication, as will be described.

Figure 2:
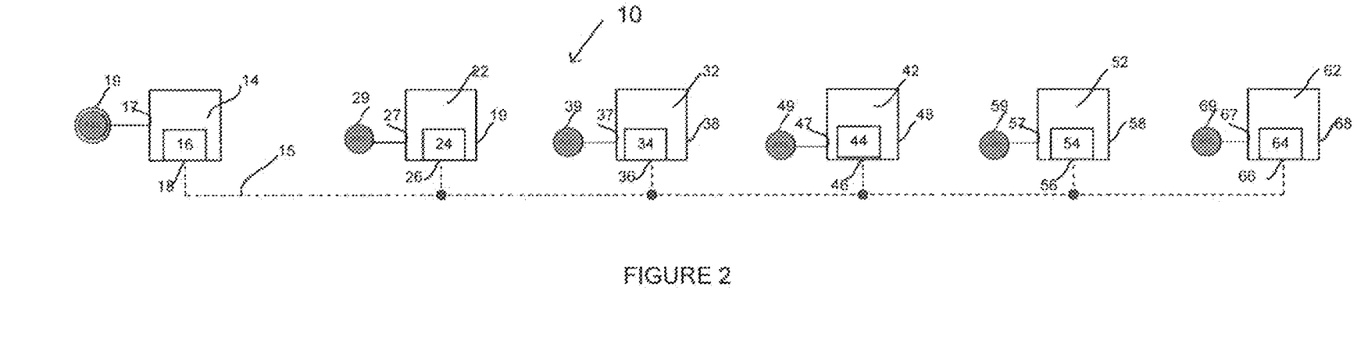
FIG. 2 illustrates a schematic representation of the electrical system of the combination vehicle shown in FIG. 1.

FIG. 2 illustrates a view of the representative electrical system of the combination vehicle 10 shown in FIG. 1. The tractor controller 14 includes a communications port 18 for receiving and transmitting messages. The communications port 18 communicates with the vehicle communications bus. In this combination vehicle 10, the vehicle communications bus is the power line 15 that is shared with all of the vehicles in the combination vehicle 10. The power line 15 is typically connected to ignition power, which is received from a twelve volt DC battery (not shown) on the tractor 12 when the tractor 12 is powered on by the driver. The tractor controller 14 includes an output 17 for transmitting a signal to the towed vehicle ABS fault indicator 19. The tractor controller 14 includes a processing and memory unit that executes and persistently stores computer-executable instructions for performing the various methods, functions, protocols, procedures, etc., described herein. The processing and memory unit may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit includes control logic 16 for receiving messages on the vehicle communications bus via the communications port 18. One type of message received by the tractor controller 14 is an ABS fault message generated by any one of the towed vehicle controllers 22, 32, 42, 52, 62.

The first towed vehicle controller 22 includes a communications port 26. The communications port 26 communicates with the power line 15 that is shared with the other vehicles in the combination vehicle 10. The first towed vehicle controller 22 also includes an output 27 for transmitting a signal to the first towed vehicle ABS fault indicator 29. The first towed vehicle controller 22 includes a processing and memory unit that executes and persistently stores computer-executable instructions for performing the various methods, functions, protocols, procedures, etc., described herein. The processing and memory unit may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit includes control logic 24 for determining faults and determining a time elapsed since the combination vehicle 10 was powered on. The control logic 24 is also capable of receiving and transmitting status messages and fault messages via the communications port 26 and determining a message load on the power line 15. A fault message transmitted by the control logic 24 is transmitted at a first period in time.

The second towed vehicle controller 32 includes a communications port 36. The communications port 36 communicates with the power line 15 that is shared with the other vehicles in the combination vehicle 10. The second towed vehicle controller 32 also includes an output 37 for transmitting a signal to the second towed vehicle ABS fault indicator 39. The second towed vehicle controller 32 includes a processing and memory unit 34 that executes and persistently stores computer-executable instructions for performing the various methods, functions, protocols, procedures, etc., described herein. The processing and memory unit 34 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit includes control logic 34 for determining faults and determining a time elapsed since the combination vehicle 10 was powered on. The control logic 34 is also capable of receiving and transmitting status messages and fault messages via the communications port 36 and determining a message load on the power line 15. A fault message transmitted by the control logic 34 is transmitted at a second period in time, the second period in time being different than the first period in time.

The third towed vehicle controller 42 includes a communications port 46. The communications port 46 communicates with the power line 15 that is shared with the other vehicles in the combination vehicle 10. The third towed vehicle controller 42 also includes an output 47 for transmitting a signal to the third towed vehicle ABS fault indicator 49. The third towed vehicle controller 42 includes a processing and memory unit 44 that executes and persistently stores computer-executable instructions for performing the various methods, functions, protocols, procedures, etc., described herein. The processing and memory unit 44 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit includes control logic 44 for determining faults and determining a time elapsed since the combination vehicle 10 was powered on. The control logic 44 is also capable of receiving and transmitting status messages and fault messages via the communications port 46 and determining a message load on the power line 15. A fault message transmitted by the control logic 44 is transmitted at a third period in time, which is different than the first period in time and the second period in time.

The fourth towed vehicle controller 52 includes a communications port 56. The communications port 56 communicates with the power line 15 that is shared with the other vehicles in the combination vehicle 10. The fourth towed vehicle controller 52 also includes an output 57 for transmitting a signal to the fourth towed vehicle ABS fault indicator 59. The fourth towed vehicle controller 52 includes a processing and memory unit 54 that executes and persistently stores computer-executable instructions for performing the various methods, functions, protocols, procedures, etc., described herein. The processing and memory unit 54 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit includes control logic 54 for determining faults and determining a time elapsed since the combination vehicle 10 was powered on. The control logic 54 is also capable of receiving and transmitting status messages and fault messages via the communications port 56 and determining a message load on the power line 15. A fault message transmitted by the control logic 54 is transmitted at a fourth period in time, which is different than the first period in time, second period in time and third period in time.

The fifth towed vehicle controller 62 includes a communications port 66. The communications port 66 communicates with the power line 15 that is shared with the other vehicles in the combination vehicle 10. The fifth towed vehicle controller 62 also includes an output 67 for transmitting a signal to the fifth towed vehicle ABS fault indicator 69. The fifth towed vehicle controller 62 includes a processing and memory unit 64 that executes and persistently stores computer-executable instructions for performing the various methods, functions, protocols, procedures, etc., described herein. The processing and memory unit 64 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit includes control logic 64 for determining faults and determining a time elapsed since the combination vehicle 10 was powered on. The control logic 64 is also capable of receiving and transmitting status messages and fault messages via the communications port 66 and determining a message load on the power line 15. A fault message transmitted by the control logic 64 is transmitted at a fifth period in time, which is different than the first period in time, second period in time, third period in time and fourth period in time.

Accordingly, a first towed vehicle controller comprises an enclosure and a controller in the enclosure. The controller comprises a processor with control logic, the control logic capable of determining at least one of a status and a fault of the first towed vehicle and transmitting fault messages and status messages on the vehicle communications bus receiving fault messages and status messages on a vehicle communications bus. The control logic receives a fault message from a second towed vehicle controller on the vehicle communications bus at a second period in time and transmits the fault message of the second towed vehicle controller to the vehicle communications bus at a first period in time, which is different than the second period in time.

In accordance with another example, a system for a combination vehicle having a plurality of towed vehicles comprises a tractor controller in communication with a vehicle communications bus; a first towed vehicle controller in communication with the vehicle communications bus and capable of receiving and transmitting messages to the vehicle communications bus; and a second towed vehicle controller in communication with the vehicle communications bus and capable of receiving and transmitting messages to the vehicle communications bus at a second period in time. The first towed vehicle controller discontinues transmitting a status message in response to receiving a fault message from the second towed vehicle controller and starts transmitting the fault message of the second towed vehicle controller to the vehicle communications bus at the first period in time, which is different than the second period in time.

Figure 3:
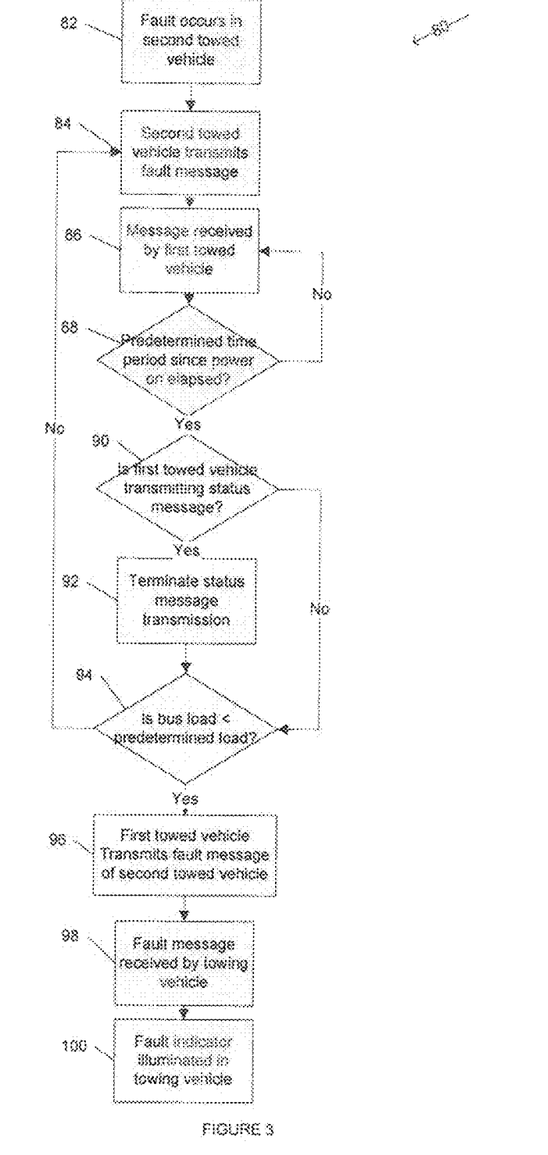
FIG. 3 illustrates a method of implementing the fault communication system, according to an example of the present invention.

A flowchart for implementing a method 80 of the present invention is shown in FIG. 3. In step 82, the second towed vehicle control logic 34 determines a fault has occurred in the anti-lock brake system of the second towed vehicle 30. In step 84, the control logic 34 begins transmitting a fault message at a second period in time via the communications port 36. The fault message is transmitted using a bidirectional serial communications protocol, such as SAE J1587 Electronic Data Interchange Between Microcomputer Systems in Heavy-Duty Vehicle Applications, over the vehicle power line 15 using a physical layer protocol such as SAE J2497 Power Line Carrier Communications for Commercial Vehicles. The fault message is encoded according to the physical layer protocol and sent with a certain message frequency, such as about once every 500 milliseconds, and the resultant signal on the power line has a specific amplitude, such as about 4V peak to peak. The fault message is sent continuously as long as a fault is present at the second towed vehicle 30. The second towed vehicle control logic 34 also transmits a signal to the output 37 to illuminate the fault indicator 39 on the second towed vehicle 30.

In step 86, the fault message is received by the first towed vehicle 20 at the communications port 26. The fault message transmitted on the power line 15 may experience attenuation, mainly due to the loading on the power line 15 from the controllers 22, 32, 42, 52, 62 and other electrical equipment on the same power line 15. The signal to noise ratio decreases as the amount of electrical equipment on the power line 15 increases. Some attenuation is also due to the length of the power line, which may be over thirty feet, as well as due to noise or interference. The fault message amplitude may be degraded by several volts from the original amplitude due to any or all of these reasons. However, as long as the fault message meets a predetermined minimum amplitude at the communications port 26, the fault message can be received and interpreted by the first towed vehicle control logic 24. In one example, the predetermined minimum amplitude is about fifty millivolts peak to peak.

In step 88, the control logic 24 determines if a predetermined time period has elapsed since the power on of the combination vehicle 10. As part of a test sequence, each controller 22, 32, 42, 52, 62 sends a fault message on the power line 15 immediately upon power on of the combination vehicle 10 in order to test the towed vehicle ABS fault indicator 19 operation in the tractor 12. The predetermined time period is set at about one minute to ensure that the fault message received by the first towed vehicle controller 22 is actually an ABS fault of the second towed vehicle controller 32 and not part of the power on test of ABS fault indicator 19. If the predetermined time period has elapsed, the method 80 proceeds to step 90. If the predetermined time period has not elapsed, the method 80 returns to step 86 to wait for a fault message to be received.

In step 90, the control logic 24 checks whether the first towed vehicle controller 22 is transmitting its own status message on the power line 15. The first towed vehicle controller 22 may be transmitting a status message over the communications port 26 concerning a state of the first towed vehicle 20. Examples of status messages include a door ajar, odometer mileage and tire pressure values. These status messages have a lower priority than an ABS fault message. If the control logic 24 is transmitting a status message in step 90, the status message is terminated in step 92 and the method 80 continues to step 94. If the first towed vehicle control logic 24 is not transmitting a status message, the method 80 continues directly to step 94.

In step 94, the control logic 24 determines the load, or number of messages, currently on the power line 15. If the message load is greater than or equal to a predetermined load, the method 80 returns to step 84 to wait for fault messages and for the message load to decrease. In another embodiment, if the message load is greater than or equal to a predetermined message load, the control logic (24) waits a random amount of time, such as between one and ten message times, before checking again if the message load has decreased. In one example, the predetermined message load is 80%. Factors that contribute to an increased message load on the power line 15 include other controllers that may be equipped with the method 80 of this invention that may already be repeating the fault message. If the message load is less than the predetermined load, the method 80 proceeds to step 96.

In step 96, the first towed vehicle control logic 24 transmits the fault message of the second towed vehicle 30 on the power line 15. The first towed vehicle control logic 24 does not alter the content of the fault message but rather repeats the fault message exactly as it was received. However, the control logic 24 repeats the fault message at a period in time different than the period in time used by the second towed vehicle control logic 34 to originally transmit the fault message. In this manner, both the fault message transmitted by the first towed vehicle control logic 24 and the fault message transmitted by the second towed vehicle control logic 34 do not interfere with each other on the power line 15. In addition, when the fault message is repeated by the first towed vehicle control logic 24, the fault message amplitude is increased back to an amplitude value within the specification of the particular communications protocol. The effects of noise and power line length are diminished with the repetition of the fault message of the second towed vehicle 30 by the control logic 24 of the first towed vehicle 20.

In step 98, the tractor 12 receives the fault message. The fault message is likely to be greater than a minimum amplitude due to the repetition of the fault message by the first towed vehicle control logic 24, which is located in closer proximity to the tractor 12 than the second towed vehicle 30. In addition, the fault message will be repeated at two different period in times, which increases the number of fault messages on the power line 15. The towed vehicle control logic 16 only needs to receive one of the fault messages on the power line 15 in order to send a signal to output 17 to illuminate the towed vehicle ABS fault indicator 19 in the tractor 12 in step 96. In this manner, the driver receives notice of an ABS fault at one of the towed vehicles in the combination vehicle 10.

Accordingly, a method of communicating a fault in a combination vehicle comprises receiving and transmitting messages on a vehicle communications bus among a first towed vehicle controller; a second towed vehicle controller and a tractor controller; transmitting a fault message from the second towed vehicle controller to the vehicle communications bus at a second period in time; receiving the fault message at the first towed vehicle controller on the vehicle communications bus; transmitting the fault message by the first towed vehicle controller at a first period in time, which is different than the second period in time.

The method described herein improves the transmission and likelihood of reception of a fault message by the tractor 12. A towed vehicle controller proximate to the tractor 12, such as the first towed vehicle controller 22, relays fault messages received on the power line 15 from a towed vehicle controller distal to the tractor, such as the second towed vehicle controller 32. However, the vehicle controller distal to the first towed vehicle controller can be any one of the controllers 42, 52, 62. In order to clear the fault message on the power line 15, the fault must be fixed on the second towed vehicle 30 and the entire combination vehicle 10 must undergo a power on cycle.

The method is applicable to a multi-trailer combination vehicle, such as shown in FIG. 1, so that any towed vehicle controller 22, 32, 42, 52, 62 is capable of re-transmitting a fault message from another towed vehicle controller. When the fifth towed vehicle controller 62 transmits a fault message on the power line 15, the degradation of the fault message from the fifth towed vehicle controller 62 to the tractor controller 14 could be several volts. If the fault message is lower than a predetermined minimum amplitude, the towed vehicle controller 22 would not receive and interpret the fault message and illuminate the towed vehicle ABS fault indicator 19. Repetition of the fault message at the amplitude recommended by the particular protocol by any other controller on the vehicle communications bus increases the likelihood of reception of the ABS fault message by the towed vehicle.

The number of towed vehicles in a combination vehicle may be as few as two or greater than five, depending on the configuration. While it is contemplated that all of the controllers on the combination vehicle include the control logic for implementing this invention, the method described herein will function with a single towed vehicle controller capable of implementing the method of this invention being the towed vehicle proximate to the towed vehicle, but not necessarily connected directly to the towed vehicle, and any other number or types of controllers in between the controller implementing this invention and the controller transmitting the fault message.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A controller for a towed vehicle comprising:
   a communications port for receiving and transmitting messages;
   an output for transmitting a signal to an associated fault indicator on the towed vehicle; and
   a processor having control logic, the control logic:
      determining a status of the towed vehicle;
      transmitting a status message through the communications port;
      receiving a fault message from an associated other towed vehicle controller through the communications port;
      terminating the transmission of the status message through the communications port in response to receiving the fault message from the associated other towed vehicle controller;
      transmitting the fault message of the associated other towed vehicle controller through the communications port; and
      transmitting a signal to illuminate the associated fault indicator in response to transmitting the fault message.

2. The controller as in claim 1, wherein the controller transmits the status message at a first period in time, receives the fault message at a second period in time and transmits the fault message continuously at the first period in time, the first period in time being different than the second period in time.

3. The controller as in claim 1, wherein the status message is one of an odometer message, a door ajar message and a tire pressure message.

4. The controller as in claim 1, wherein the communications port further receives ignition power.

5. The controller as in claim 1, wherein the control logic uses SAE J2497 protocol to receive and transmit messages through the communications port.

6. The controller as in claim 5, wherein the control logic increases the amplitude of the fault message to a minimum value specified by the SAE J2497 protocol as a function of transmitting the fault message.

7. The controller as in claim 1, wherein the fault message is an anti-lock brake system fault message.

8. The controller as in claim 1, wherein the control logic determines the message load through the communications port and transmits the fault message of the associated other towed vehicle controller in response the message load being less than a predetermined message load.

9. A system for a combination vehicle having a tractor and a plurality of towed vehicles comprising:
   a tractor controller on a tractor;
   a vehicle communications bus in communication with the tractor controller;
   a first towed vehicle controller on a first towed vehicle in communication with the vehicle communications bus; wherein the first towed vehicle controller receives and transmits messages on the vehicle communications bus; and
   a second towed vehicle controller on a second towed vehicle in communication with the vehicle communications bus; wherein the second towed vehicle receives and transmits messages on the vehicle communications bus; the second towed vehicle controller transmits a fault message on the vehicle communications bus and the first towed vehicle controller transmits the fault message of the second towed vehicle controller to the vehicle communications bus in response to receiving the fault message from the second towed vehicle controller; the first towed vehicle controller terminates transmission of a status message in response to receiving the fault message from the second towed vehicle controller; and the tractor controller receives the fault message on the vehicle communications bus and illuminates a fault indicator in the tractor.

10. The system as in claim 9, wherein the first towed vehicle controller transmits the fault message continuously at a first period in time subsequent to receiving the fault message from the second towed vehicle controller at a second period in time.

11. The system as in claim 9, wherein the first towed vehicle is proximate to the tractor and the second towed vehicle is distal to the tractor.

12. The system as in claim 9, wherein the second towed vehicle is separated from the first towed vehicle by at least one additional towed vehicle.

13. The system as in claim 9, wherein the vehicle communications bus is a power line common to the tractor controller, the first towed vehicle controller and the second towed vehicle controller.

14. The system as in claim 9, wherein the tractor controller, the first towed vehicle controller and the second towed vehicle controller use SAE J2497 protocol to receive and transmit messages on the vehicle communications bus.

15. The system as in claim 14, wherein the first towed vehicle controller increases the fault message amplitude to a minimum value specified by the SAE J2497 protocol as a function of transmitting the fault message.

16. The system as in claim 9, wherein the fault message is an anti-lock brake system fault message.

\* \* \* \* \*